United States Patent
Bush et al.

(10) Patent No.: US 6,566,841 B2
(45) Date of Patent: May 20, 2003

(54) SCROLL COMPRESSOR HAVING MULTIPLE MOTOR PERFORMANCE CHARACTERISTICS

(75) Inventors: James W. Bush, Skaneateles, NY (US); John R. Williams, Bristol, VA (US); Zili Sun, Arkadelphia, AR (US); Carlos Zamudio, Arkadelphia, AR (US); Jason Hugenroth, Hope, AR (US); Gregory W. Hahn, Arkadelphia, AR (US); Thomas Barito, Arkadelphia, AR (US); Joe T. Hill, Bristol, VA (US)

(73) Assignee: Scroll Technologies, Arkadelphia, AR (US)

( * ) Notice: Subject to any disclaimer, the term of this patent is extended or adjusted under 35 U.S.C. 154(b) by 0 days.

(21) Appl. No.: 09/779,800

(22) Filed: Feb. 8, 2001

(65) Prior Publication Data

US 2002/0105301 A1 Aug. 8, 2002

(51) Int. Cl.$^7$ ................................. H02P 1/26
(52) U.S. Cl. .................. 318/771; 318/751; 318/752; 318/753; 318/754; 318/774; 318/797
(58) Field of Search ................ 318/751, 752, 318/753, 754, 771, 797, 774

(56) References Cited

U.S. PATENT DOCUMENTS

| | | | | | |
|---|---|---|---|---|---|
| 3,274,472 A | * | 9/1966 | Slattery | ................ | 318/200 |
| 3,588,649 A | * | 6/1971 | Heine | ................ | 318/224 |
| 3,887,854 A | * | 6/1975 | Parks | ................ | 318/224 A |
| 4,012,678 A | * | 3/1977 | Blaha | ................ | 318/221 D |
| 4,030,008 A | * | 6/1977 | Buckle et al. | ................ | 318/220 B |
| 4,107,583 A | * | 8/1978 | Houtman | ................ | 318/221 D |
| 4,187,457 A | * | 2/1980 | Wanlass | ................ | 318/729 |
| 4,263,540 A | | 4/1981 | Brandt | | |
| 4,465,960 A | * | 8/1984 | Pfarrer | ................ | 318/774 |
| 4,520,303 A | * | 5/1985 | Ward | ................ | 318/778 |
| 4,623,829 A | * | 11/1986 | Smith et al. | ................ | 318/793 |
| 5,159,255 A | * | 10/1992 | Weber | ................ | 318/775 |
| 5,227,710 A | * | 7/1993 | Lewus | ................ | 318/781 |
| 5,300,871 A | * | 4/1994 | Bucker et al. | ................ | 318/794 |
| 5,404,088 A | * | 4/1995 | Nanos | ................ | 318/751 |
| 5,514,943 A | | 5/1996 | Shapess | | |
| 5,867,005 A | * | 2/1999 | Brown | ................ | 318/751 |
| 5,898,250 A | * | 4/1999 | Sugita et al. | ................ | 310/166 |
| 5,973,473 A | * | 10/1999 | Anderson et al. | ................ | 318/785 |
| 6,121,746 A | * | 9/2000 | Fisher et al. | ................ | 318/772 |
| 6,171,064 B1 | * | 1/2001 | Hugenroth et al. | ................ | 417/32 |
| 6,175,208 B1 | * | 1/2001 | Rose | ................ | 318/751 |

FOREIGN PATENT DOCUMENTS

| | | |
|---|---|---|
| DE | 22 61 435 | 6/1974 |
| DE | 196 42 098 | 4/1998 |
| EP | 0378693 | 12/1989 |
| GB | 2009538 | 6/1979 |
| JP | 57 020194 | 2/1982 |

* cited by examiner

Primary Examiner—Robert E. Nappi
Assistant Examiner—Rina I. Duda
(74) Attorney, Agent, or Firm—Carlson Gaskey & Olds PC

(57) ABSTRACT

A system includes a motor mounted within a housing and a compressor pump unit. A single-phase PSC motor includes a switch assembly which selectively connects primary or alternate windings. During normal load operation, when maximum efficiency is desired, the switch is placed in one position, then during high load operation, when maximum torque output is needed at maximum a load point, the switch is placed in the closed position. In effect, the number of main winding turns is decreased and the motor is strengthened. As the auxiliary capacitors are also now connected in parallel, the net effect is an increase in the total auxiliary capacitance, which also serves to strengthen the motor. Another embodiment provides a switch for a three-phase WYE connected motor. In yet another embodiment, a three phase delta connected motor switch is provided.

20 Claims, 2 Drawing Sheets

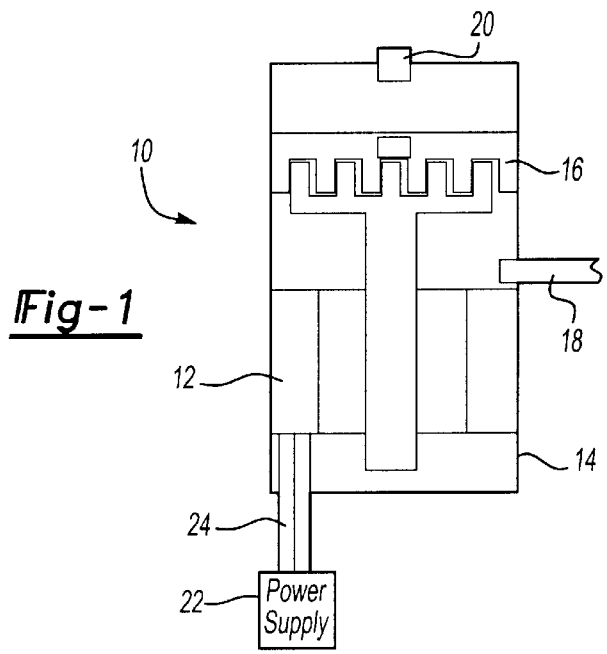
_Fig-1_
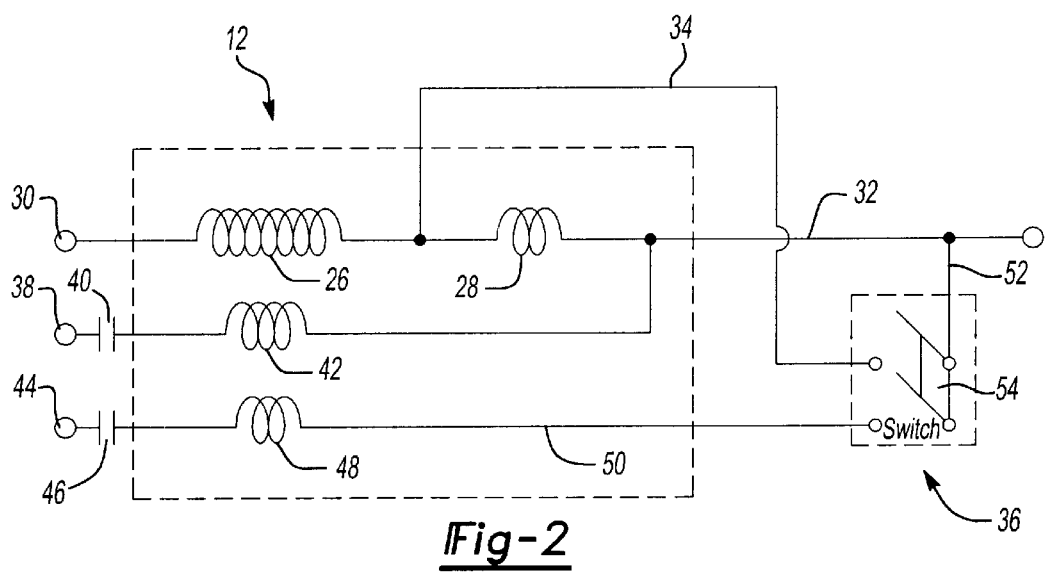
_Fig-2_
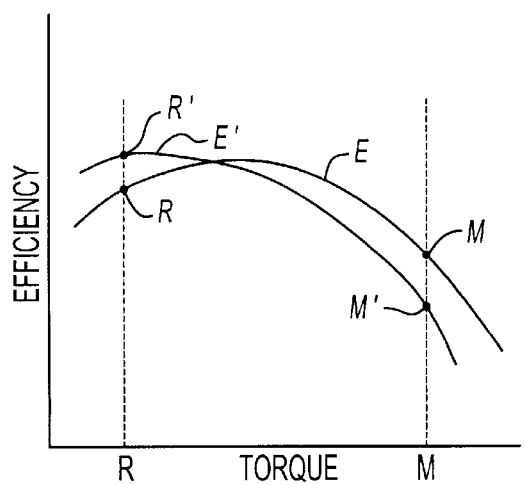
_Fig-3_

SCROLL COMPRESSOR HAVING MULTIPLE MOTOR PERFORMANCE CHARACTERISTICS

BACKGROUND OF THE INVENTION

The present invention relates to adjusting the motor performance of a scroll compressor to selectively provide maximum efficiency and maximum torque.

A scroll compressor generally includes a pair of interfitting scroll wraps each connected to a planar base. One of the wraps is non-orbiting and the other wrap orbits relative to the non-orbiting wrap. The wraps are in contact with each other and define compressive chambers for an entrapped fluid. As the orbiting scroll moves relative to non-orbiting scroll, the size of the compression chambers change to compress the fluid.

Scroll compressors are widely utilized in many compression applications. Scroll compressors have high efficiency and thus are increasing in popularity. However, there are some challenges during scroll compressor operation.

An electric motor is commonly provided to drive compressors including most scroll compressors. The motor must typically produce a greater quantity of torque for some operating conditions than is required for other operating conditions. The need to provide a wide range of output torques often requires an undesirable compromise in the motor performance characteristics over its range of operation.

One known drive motor is a phase split capacitor (PSC) single phase motor. A main winding and an auxiliary winding each have an input lead while also sharing a common lead. The main winding input lead supplies electric current to the main winding which also passes through the common output lead. The auxiliary winding input lead includes a capacitor prior to the auxiliary winding. The current passes through the capacitor, through the auxiliary winding and also through the common lead. The capacitor provides an electrical phase offset between main winding and auxiliary winding currents to allow self-starting of the motor and to augment its performance when running under load. The number of turns of wire in the main and auxiliary windings determine the performance characteristics of the motor.

A typical performance curve for a known PSC single phase motor is defined by plotting the motor efficiency E as a function of motor output torque. Two defining points on the E curve are the maximum torque point M and the rating point R. The maximum torque output M of the known PSC motor is specified so that the motor will not stall when running at peak load. The known PSC motor is designed to deliver maximum output and to deliver the highest possible efficiency at rating point R. Often, these two load points are far apart. It is therefore not possible to both achieve maximum efficiency at load point R while still being able to run at maximum load point M. In other words, the peak of the efficiency curve E falls somewhere between rating point R and maximum load point M. Thus the efficiency of the motor at the rating point R must be compromised to assure that the motor will deliver maximum torque M when needed.

The efficiency of the motor at rating point R can be increased by adding turns to main winding and auxiliary windings, and, optionally, increasing the capacitance of the capacitor. However, this also weakens the motor and reduces the torque output at the maximum load point.

Accordingly, it is desirable to provide a motor with multiple windings which can be selectively connected to provide maximum efficiency at rating point R or reconnected to provide maximum torque output at maximum load point M as required.

SUMMARY OF THE INVENTION

The compressor system according to the present invention generally includes a motor mounted within a housing and a pump unit. The pump unit is preferably a scroll compressor. A power supply supplies the phase power to the motor.

In one embodiment of the present invention, a single phase PSC motor includes a switch assembly that includes a double pole single throw type switch in which alternate leads are individually connected to separate poles on one side of the switch. During normal load operation, when maximum efficiency is desired, the switch is placed in the open position. Current passes through first and second main windings and on to the common lead. Current also passes through a first auxiliary capacitor and a first auxiliary winding connected in parallel with the first and second main windings.

During high load operation, when maximum torque output is needed at a load point, the switch is placed in the closed position. Current, which formerly flowed through the second main winding, is now bypassed through the alternate lead, the switch, and out through common lead. Current is also passed through a second auxiliary capacitor and a second auxiliary winding in parallel with the first auxiliary capacitor and the first auxiliary winding. In effect, this reduces the number of main winding turns in the motor and thus strengthens it. The fact that the auxiliary windings are connected in parallel also has the net effect of reducing the auxiliary winding inductance, which has the same net effect as if turns were removed from the auxiliary winding without adding in the second auxiliary lead with the auxiliary winding into the circuit. That is, during normal steady operation, when high load is required, the switch is closed.

As the auxiliary capacitors are also now connected in parallel, the net effect is an increase in the total auxiliary capacitance, which also serves to strengthen the motor. The division between the number of turns in the first and second main windings, the number of turns in the second auxiliary winding, and the capacitance of second auxiliary capacitor are all preferably selected to achieve maximum torque output at the maximum load point.

Another embodiment of the present invention provides a three-phase WYE connected motor. Input leads are each connected to a separate leg of a three phase power supply. During normal load operation, a first set of main windings, a second set of main windings and a third set of main windings are connected in parallel to a common pole. Each set of windings includes a first and a second winding connected in series. The number of turns in the first set of main windings, the second set of main windings and the third set of main windings are all selected to provide high efficiency at a load point.

During high load operation, when maximum torque output is needed at a load point, the switch is placed in the closed position. Current, which formerly flowed through the second main winding, is now bypassed through the alternate lead, the switch, and out through common lead. Current is also passed through a second auxiliary capacitor and a second auxiliary winding in parallel with the first auxiliary capacitor and the first auxiliary winding. In effect, this reduces the number of main winding turns in the motor and thus strengthens it. The fact that the auxiliary windings are connected in parallel also has the net effect of reducing the auxiliary winding inductance, which has the same net effect as if turns were removed from the auxiliary winding without adding in the second auxiliary lead with the auxiliary winding into the circuit. That is, the switch is closed while the motor is running and when high load is required.

In yet another embodiment, a switch for a three phase delta connected motor is provided. Input leads are each connected to a separate leg of a three phase power supply. Each main winding is split into two windings in series. Leads tap between each of the respective pairs of coils and run to a switch assembly which preferably includes a single throw triple pole switch. Each lead is connected to one of the three poles of the switch.

When the switch is in the open position, the motor operates as a delta connected motor with all coils energized, that is, it is configured for high efficiency. When the switch is in the closed position, the motor is configured for maximum torque output at a maximum load point.

Preferably the switch assemblies communicate with a controller and the motor. The controller responds to any number of input variables to control the operation and timing of the switching. Such input variable can include current through the motor, motor temperature, pump temperature, pump pressure inputs, and others.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1 is a general schematic view of a compressor system according to the present invention;

FIG. 2 is one embodiment of a motor and controller according to the present invention;

FIG. 3, is a graphical representation of an efficiency curve of a motor operating according to the present invention;

DETAILED DESCRIPTION OF THE PREFERRED EMBODIMENT

Figure 4:
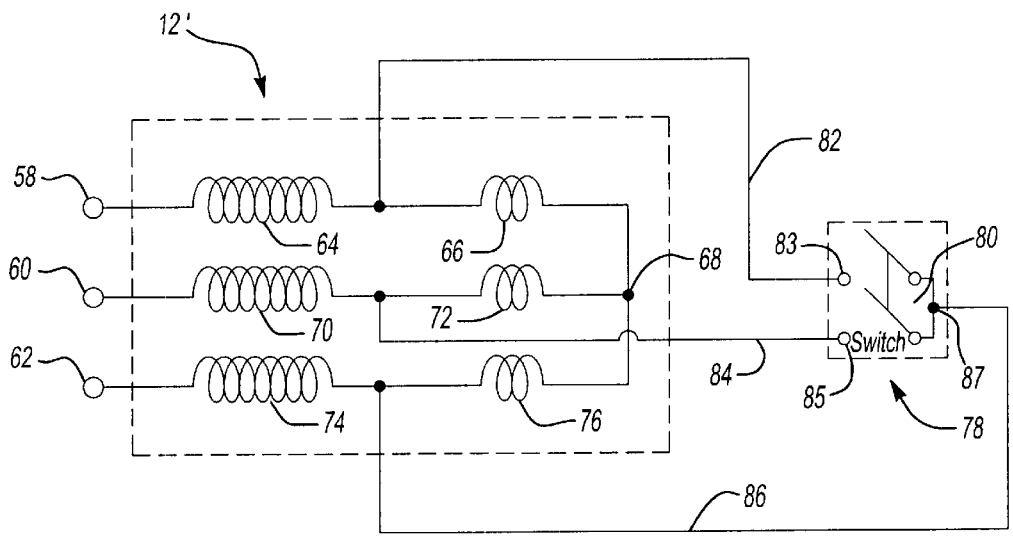
FIG. 4 is another embodiment of a motor and controller according to the present invention.

FIG. 1 illustrates a compressor system 10. The system 10 generally includes a motor 12 (shown schematically) mounted within a housing 14 and a pump unit 16. The pump unit 16 is preferably a scroll compressor. A suction input 18 leads into the housing 14 while an outlet 20 leaves the housing 14 at another location. Preferably, a power supply 22 supplies power to the motor 12 through power leads 24.

Referring to FIG. 2, a schematic view of a PSC motor 12 designed according to the present invention is illustrated. First main winding 26 is connected in series with second main winding 28 and is fed by input lead 30. Current passes from input lead 30 through the first and second main windings 26 and 28 and then passes into common lead 32.

Alternate lead 34 taps the circuit between first and second main windings 26 and 28 and passes to switch assembly 36. First auxiliary winding lead 38 supplies current to a first capacitor 40 and a first auxiliary winding 42. The current also passes on to common lead 32.

Second auxiliary winding lead 44 supplies current to second capacitor 46 and a second auxiliary winding 48. The current then passes through a second alternate lead 50 and into switch assembly 36. Lead 52 taps between common lead 32 and the switch assembly 36. Input leads 30, 38, and 44 are all connected together to one leg of a single phase power supply 22 (FIG. 1).

Switch assembly 36 preferably includes a double pole single throw type switch 54 in which alternate leads 34 and 50 are individually connected to separate poles on one side of switch 36. Lead 52 is connected to both poles on the other side of switch 36 forming a common pole. In this manner, alternate leads 34 and 50 are isolated when switch 36 is in an open position and are connected to each other and to common lead 32 through lead 52 when switch 36 is in a closed position.

During normal load operation, when maximum efficiency at rating point R (FIG. 3) is desired, switch 36 is placed in the open position. Current passes from lead 30 through first and second main windings 26 and 28 and on to common lead 32. Current also passes from lead 38 through the first auxiliary capacitor 40 and the first auxiliary winding 42 and on to common lead 32. Since switch 36 is open alternate lead 50 is isolated from lead 52 and no current flows through secondary capacitor 46 and secondary winding 48. The number of respective turns in the first main winding 26, the second main winding 28, first auxiliary winding 42 and the capacitance of first auxiliary capacitor 40 are all preferably selected to achieve high efficiency at rating point R. This is illustrated by curve E' in FIG. 3 where the efficiency at rating point R' is at a maximum and the maximum load point M' corresponds to a low point in the efficiency curve.

During high load operation, when maximum torque output is needed at maximum load point M (FIG. 3), switch 36 is placed in the closed position. Current which formerly flowed through the second main winding 28 is now bypassed through alternate lead 34, switch 36, lead 52 and out through common lead 32. This has the effect of reducing the number of main winding turns in motor 12 and thus strengthens it. An additional current also now flows from second auxiliary lead 44 through second auxiliary capacitor 46, second auxiliary winding 48 and on through lead 50, switch 36, lead 52 and out through common lead 32. The fact that windings 42 and 48 are now connected in parallel has the net effect of reducing the total auxiliary winding inductance, which has the same net effect as if turns were removed from auxiliary winding 42 without adding in second auxiliary lead 44 with auxiliary winding 48 into the circuit. This also serves to strengthen the motor 12.

The fact that auxiliary capacitors 40 and 46 are connected in parallel has the net effect of increasing the total auxiliary capacitance, which also serves to strengthen the motor 12. The division between the number of turns in first and second main windings 26 and 28, the number of turns in second auxiliary winding 48, and the capacitance of second auxiliary capacitor 46 are all selected to achieve maximum torque output at maximum load point M (FIG. 3). This is illustrated by curve E in FIG. 3 where the efficiency at rating point R has been reduced and the efficiency at maximum load point M has increased.

Referring to FIG. 4 another embodiment of the present invention provides a three-phase WYE connected motor 12'. The three-phase WYE connected motor 12' has performance characteristics similar to those illustrated in FIG. 3. Input leads 58, 60 and 62 are each connected to a separate leg of a three phase power supply 22 (FIG. 1).

During normal load operation, switch assembly 78 is open such that current passes from input lead 58 through first windings 64 and 66 and on to common node 68. From the second input lead 60 current passes through second windings 70 and 72 and on to common node 68. From third input lead 62 current passes through main windings 74 and 76 and on to common node 68. The number of turns in first main windings 64 and 66, second main windings 70 and 72, and third main windings 74 and 76 are all selected to provide high efficiency at load point R' (FIG. 3).

The switch assembly 78 includes a double pole single throw switch 80 which has one pair of poles connected together into a common pole 87. Lead 82 connects between first main windings 64 and 66 and passes to a first pole 83 of switch 80. Lead 84 connects between second main windings 70 and 72 and passes to a second pole 85 of switch 80. Lead 86 connects between third main windings 74 and 76 and passes to the common pole 87 of switch 80.

During high load operation, switch assembly 78 is closed and main windings 66, 72, and 76 are shorted out such that no current passes through them. Main windings 64, 70, and 74 are now connected together through switch 78 which now forms a new common node between these three main windings. The division of windings between first main windings 64 and 66, second main windings 70 and 72, and third main windings 74 and 76 are chosen such that first main winding 64, second main winding 70, and third main winding 74 together provide maximum torque output at maximum load point M (FIG. 3).

Figure 5:
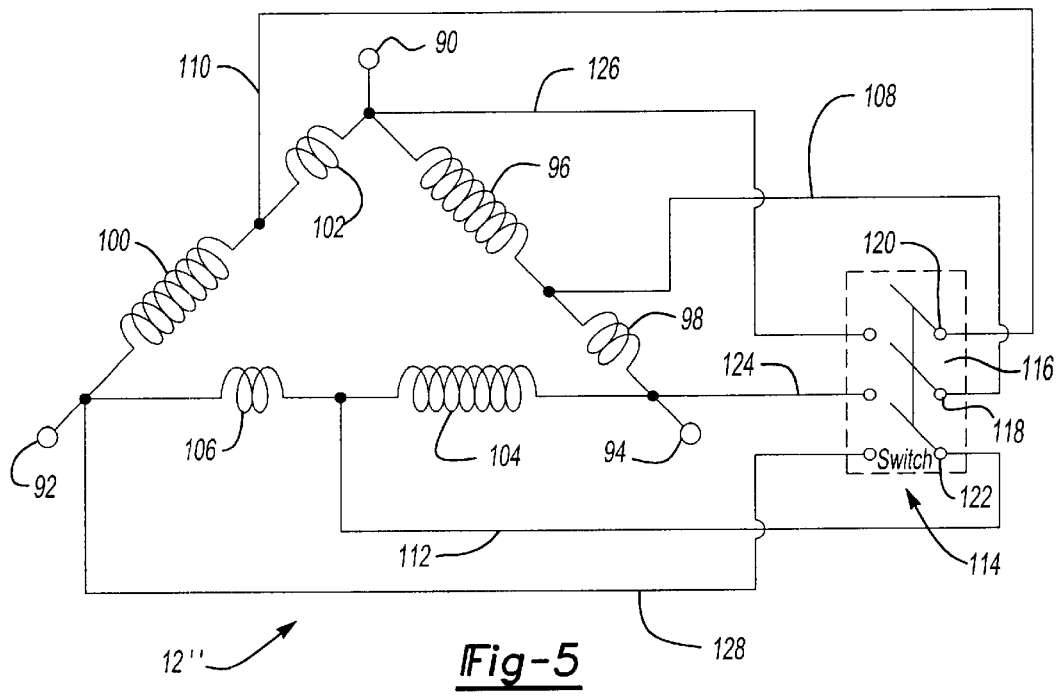
FIG. 5 is yet another embodiment of a motor and controller according to the present invention.

FIG. 5 illustrates another embodiment of the present invention applied to a three phase delta connected motor 12". Input leads 90, 92, and 94 are each connected to a separate leg of a three phase power supply 22 (FIG. 1). Each main winding is split into two windings in series, thus coils 96 and 98 comprise one main winding, coils 100 and 102 another main winding, and coils 104 and 106 a third main winding. Leads 108, 110, and 112 tap between each of the respective pairs of coils and run to switch assembly 114 which preferably includes a single throw triple pole switch 116. Leads 108, 110, and 112 are each connected to one of the three poles 118, 120, 122, of the switch 116, respectively. In addition, leads 124, 126, and 128 connect between the other side of each respective switch pole 118, 120, and 122 and input leads 94, 90, and 92, respectively.

When switch 116 is in the open position, motor 12" operates as a delta connected motor with all coils energized and has a performance characteristic similar to curve E' in FIG. 3, that is, it is configured for high efficiency at rating point R but will be weak at maximum load point M. When switch 116 is in the closed position, coils 98, 102 and 106 are each shorted out, reducing the number of active coils in each set of main windings. Motor 12" is thus strengthened and has a performance characteristic similar to curve E in FIG. 3.

Figure 6:
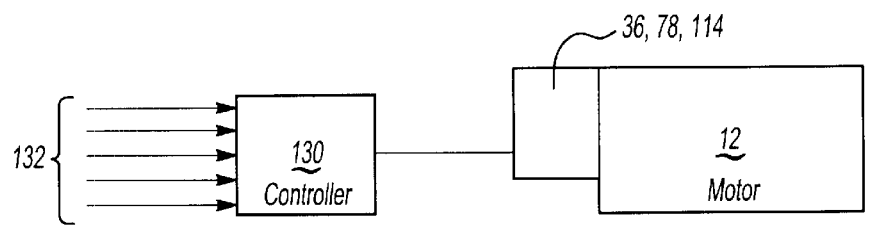
FIG. 6 is a general schematic representation of a switch assembly and controller for a compressor system according to the present invention.

Referring to FIG. 6, switch assemblies 36, 78, 114 preferably communicate with a controller 130 and motor 12. The controller 130 preferably responds to any number of input variables 132 to control the operation and timing of the switching. Current through the motor 12 is one preferred input variable 132, however other variables can also be used, such as, for example, motor temperature. Other input variables 132 can include pump unit 16 (FIG. 1) operating variables such as temperature and pressure inputs. Monitoring of these input variables 132 are preferably implemented within the controller 130 software which then generates a signal to actuate the switch assembly. Alternatively, controller 130 could be a mechanical device such as a temperature or current sensitive actuator. This for example could be a commercially available motor protection switch.

As can be seen, and as can be understood by a worker in this art, there are not truly two distinct circuits which would be involved in the motor and switch assembly. However, for purposes of this application, the two functional circuits which would exist within the probable single motor and switch assembly will be claimed as a first and second circuit. A worker in this art would recognize the meaning of such limitations.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An electric motor for a compressor system comprising:
   at least one common winding;
   a first winding that forms a first circuit for substantially optimized efficiency when connected to said at least one common winding;
   a second circuit winding that forms a second circuit for substantially optimized torque when connected to at least one common winding; and
   a switch connected to at least one of said first winding and said second winding to selectively bypass and connect said at least one of said first winding and said second winding while the electric is motor is running depending upon whether optimized torque or optimized efficiency is desired during motor operation.

2. The motor or claim 1, wherein said at least one common winding and said first winding are connected in series.

3. The motor of claim 2, wherein the second winding is connected in parallel to said at least one common winding and said first winding.

4. The motor of claim 3, further comprising an auxiliary winding connectable by said switch in parallel to said at least one common winding and said second winding.

5. The motor of claim 1, wherein said switch comprises a double-pole single-throw switch.

6. An electric motor for a compressor system comprising:
   a first lead having a first winding and a second winding, a second lead having a first winding and a second winding, and a third lead having a first winding and a second winding; and
   a switch connected to said first, second and third leads, wherein said switch selectively bypasses the second winding in at least one of said first, second and third leads during motor operation to form a first circuit that substantially optimizes torque and selectively reconnects the second winding in at least one of said first, second and third leads during motor operation to form a second circuit that substantially optimizes efficiency.

7. The motor of claim 6, wherein the motor is a three-phase wye-connected motor.

8. The motor of claim 7, wherein the first winding and the second winding in each of said first, second and third leads are connected in series, and wherein said first, second and third leads are connected together in parallel.

9. The motor of claim 7, wherein said switch comprises a double-pole, single-throw switch.

10. The motor of claim 6, wherein the motor is a three-phase delta-connected motor.

11. The motor of claim 10, wherein the first winding and the second winding in each of said first, second and third leads are connected in series, and wherein said first, second and third leads are connected together in series.

12. The motor of claim 10, wherein said switch comprises a triple-pole single-throw switch.

13. A scroll compressor system, comprising:
a scroll pump unit including a first scroll wrap extending from a first base and a second scroll wrap extending from a second base, said second scroll wrap interfitting with said first scroll wrap to define compression chambers;
a motor for driving said second scroll in an orbiting motion relative to said first scroll, said motor including at least one common winding;
a first winding that forms a first circuit for substantially optimized efficiency when connected to said at least one common winding;
a second winding that forms a second circuit for substantially optimized torque when connected to said at least one common winding;
a power supply for supplying power to said motor;
a switch connected to at least one of said first winding and said second winding to selectively bypass and connect said at least one of said first winding and said second winding while the electric motor is running depending upon whether optimized torque or optimized efficiency is desired during motor operation; and
a controller that receives inputs from portions of said system other than said power supply, determines whether optimized torque or optimized efficiency is desired based on the inputs, and controls the switch based on the determination.

14. The system of claim 13, wherein one of said inputs is a motor temperature.

15. The system of claim 13, wherein one of said inputs is a pump temperature.

16. A scroll compressor system, comprising:
a scroll pump unit including a first scroll wrap extending from a first base and a second scroll wrap extending from a second base, said second scroll wrap interfitting with said first scroll wrap to define compression chambers;
a motor for driving said second scroll in an orbiting motion relative to said first scroll, said motor including a first lead having a first winding and a second winding, a second lead having a first winding and a second winding, and a third lead having a first winding and a second winding;
a power supply for supplying power to said motor;
a switch connected to said first, second and third leads, wherein said switch selectively bypasses the second winding in at least one of said first, second and third leads during motor operation to form a first circuit that substantially optimizes torque and selectively reconnects the second winding in at least one of said first, second and third leads during motor operation to form a second circuit that substantially optimizes efficiency; and
a controller that receives inputs from portions of said system other than said power supply, determines whether optimized efficiency or optimized torque is desired based on the inputs, and controls the switch based on the determination.

17. The system of claim 16, wherein one of said inputs is a motor temperature.

18. The system of claim 16, wherein one of said inputs is a pump temperature.

19. A method of configuring a motor operating characteristic of a compressor, comprising:
providing at least one common winding;
providing a first winding that forms a first circuit substantially optimized for maximum efficiency when connected to said at least one common winding;
providing a second winding that forms a second circuit substantially optimized for maximum torque when connected to said at least one common winding; and
selectively bypassing and reconnecting at least one of said first winding and said second winding during motor operation in response to at least one of a plurality of input variables.

20. A method of configuring a motor operating characteristic of a compressor comprising:
providing a first lead having a first winding and a second winding, a second lead having a first winding and a second winding, and a third lead having a first winding and a second winding;
selectively bypassing the second winding in at least one of said first, second and third leads during motor operation to form a first circuit that substantially optimizes torque; and
selectively reconnecting tho second winding in at least one of said first, second and third leads during motor operation to form a second circuit that substantially optimizes efficiency.

* * * * *